US005916400A

United States Patent [19]

Zaher

[11] Patent Number: 5,916,400

[45] Date of Patent: Jun. 29, 1999

[54] METHOD AND APPARATUS FOR MANIPULATING AN ARTICLE FOR APPLYING A DECORATION THEREON

[76] Inventor: Maximillian Zaher, Butjadinger Strasse 330, Oldenberg, Germany, D-26125

[21] Appl. No.: 08/966,811

[22] Filed: Nov. 10, 1997

[30] Foreign Application Priority Data

Nov. 22, 1996 [EP] European Pat. Off. ............ 96 118 791

[51] Int. Cl.[6] ........................... B44C 1/165; B32B 31/00; B05D 1/18; B25J 11/00

[52] U.S. Cl. .......................... 156/230; 156/240; 156/350; 427/434.3; 901/43

[58] Field of Search ............................. 156/64, 350, 378, 156/230, 236, 240, 244.27, 155, 277; 901/43; 427/149, 434.3

[56] References Cited

U.S. PATENT DOCUMENTS

| | | | |
|---|---|---|---|
| 3,671,288 | 6/1972 | Rosenberg | 117/39 |
| 4,010,057 | 3/1977 | Nakanishi | 156/384 |
| 4,229,239 | 10/1980 | Arai et al. | 156/155 |
| 4,231,829 | 11/1980 | Marui et al. | 156/230 |
| 4,269,650 | 5/1981 | Arai et al. | 156/540 |
| 4,348,246 | 9/1982 | Nakanishi | 156/73.1 |
| 4,353,942 | 10/1982 | Carey | 427/434.3 |
| 4,407,881 | 10/1983 | Shima et al. | 428/156 |
| 4,436,571 | 3/1984 | Nakanishi | 156/384 |
| 4,693,664 | 9/1987 | Schweiker | 414/735 |
| 5,327,058 | 7/1994 | Rembutsu | 318/568.11 |
| 5,418,041 | 5/1995 | Kent et al. | 428/195 |

OTHER PUBLICATIONS

European Search Report, EP 96 11 8791 dated Apr. 15, 1997.

*Primary Examiner*—David A. Simmons
*Assistant Examiner*—J. A. Lorengo
*Attorney, Agent, or Firm*—Webb Ziesenheim Logsdon Orkin & Hanson, P.C.

[57] ABSTRACT

A method and apparatus for applying a decoration onto an article using a robot which immerses the article into a liquid on which the decoration is floating. During the immersion operation the article to be decorated may be moved in three dimensions.

21 Claims, 4 Drawing Sheets

METHOD AND APPARATUS FOR MANIPULATING AN ARTICLE FOR APPLYING A DECORATION THEREON

BACKGROUND OF THE INVENTION

1. Field of the Invention

The invention relates to a method and an apparatus for manipulating an article for applying a decoration to the article, in the case of which the article is immersed into a liquid, on which the decoration is floating, in order to transfer the decoration onto the article.

2. Background of the Prior Art

U.S. Pat. No. 4,010,057, corresponding to German Patent No. DE-A-25 34 640, describes a method and apparatus for applying a decoration to an article using hydrostatic pressure. This patent is hereby incorporated by reference. However, neither this patent nor other patents discussed herein teach or suggest manipulating an article along axes in three dimensions to promote transferring the decoration to the article.

U.S. Pat. No. 4,348,246 and U.S. Pat. No. 4,388,866 describe transfer printing techniques in which the film with the decoration to be transferred is not placed upon a layer of water but instead is placed upon a layer of granules or a deformable layer of pins.

U.S. Pat. No. 4,436,571 describes a transfer printing technique in which the article to receive a decoration is immersed in a specific way into a flowing liquid with the decoration floating thereupon. The article is presented to the decoration in a continuous movement in the general direction of the liquid flow along a downward path oblique to the surface of the liquid and then along an upward path oblique to the surface of the liquid to provide contact between the decoration and the article.

U.S. Pat. No. 4,407,881, corresponding to German Patent DE-A-32 19 992, describes a transfer printing technique in which the decoration is supported on a layer of a special film made of a hydrophilic, deformable layer which can swell by absorption of water, and a further layer which is placed over the hydrophilic layer and is varyingly permeable to water so that the hydrophilic layer expands to a greater or lesser extent.

U.S. Pat. Nos. 4,229,239 and 4,269,650 describe another transfer printing technique in which the decoration is prepared before the transfer by a solvent in order that it detaches itself more easily from the supporting film when transferred onto the article. This activation of the decoration (printing pattern) takes place directly before transferring the film with the decoration to the surface of the water. The film supporting the decoration is water soluble so that, upon contact with the water, the film dissolves and the decoration is then floating on the surface of the water alone (without the film). The decoration is then transferred to the article to be decorated by subsequent immersion of the article. This technique utilizes a solvent in order to make the detachment of the decoration from the supporting film easier.

U.S. Pat. No. 4,231,829 describes a transfer printing technique in which boric acid or a salt thereof is added to the PVA film supporting the decoration on the liquid or to the water on which the decoration floats in order to promote the transfer process.

In prior art designs, the article to be decorated is moved along two dimensions in a main plane of movement. The main plane of movement is defined by two vectors; a vector corresponding to the direction of the flow of the liquid and a vector perpendicular (normal) to the surface of the liquid.

U.S. Pat. No. No. 4,436,571 describes an immersion operation in which an article is immersed within a liquid in a zig-zag motion wherein the angle the article enters and exits the liquid is adjustable. With this known technique the decoration of an article having a relatively complex shape is very difficult and frequently entails trial and error tests which are costly.

It is difficult to adjust the movement of the article during immersion to the flow rate of the liquid and to the movement of the decorative film floating on the liquid, respectively, and it is furthermore difficult to adjust the expansion of the decoration on the liquid relative to the article and its immersion movement. The prior art process includes too many uncontrolled parameters which must be controlled to effectively transfer with precision a decoration onto an article.

A need exists for a more effective technique for transferring a decoration onto an article and for doing so precisely even when the article has a complex shape.

SUMMARY OF THE INVENTION

One method according to the invention for achieving this object is characterized in that the article to be decorated is immersed into a flowing liquid upon which the decoration is floating, thereby coming into contact with the decoration, wherein immersing the article is comprised of the steps of moving the article vertically into the liquid along a “z” axis, and moving the article in a horizontal direction having a component along a “y” axis perpendicular to the direction of flow.

Another method according to the invention is characterized in that the article to be decorated is immersed wherein immersing the article is comprised of the steps of moving the article vertically into the liquid along a “z” axis and rotating the article about an axis having a component parallel to an “x” axis which extends in a horizontal direction parallel to the direction of flow.

One apparatus, according to the invention, for applying a decoration onto an article in which the article is immersed into a flowing liquid upon which the decoration is floating is comprised of means for moving the article vertically into the liquid along a “z” axis, and means for moving the article in a horizontal direction having a component along a “y” axis perpendicular to the direction of flow.

Another apparatus according to the invention for applying a decoration onto an article is comprised of means for moving the article vertically into the liquid along a “z” axis and means for rotating the article about an axis having a component parallel to an “x” axis which extends in a horizontal direction parallel to the direction of flow.

Still another apparatus in accordance with this invention for applying a decoration onto an article is comprised of means for moving the article vertically into the liquid along a “z” axis and means for rotating the article about an axis having a component parallel to the “z” axis.

This three-dimensional movement allows for a substantially improved adjustment of all process parameters in such a way that the decoration is transferred with the desired geometry and quality to articles which may have complex shapes. Complex articles for the herein discussed transfer printing technique are, for example, plates, telephone receivers or furniture pieces.

To accommodate the shape of the article to receive a decoration, the angles of immersion of the article into the liquid may, according to the invention, be selected about different axes and with a range of magnitudes depending on the immersion rate, the flow rate of the water and of the film as it extends and/or condenses on the water surface. The film may also be extended or condensed by using nozzles arranged below the water surface which produce currents in the water to extend and/or condense the decorative film floating on the surface in a desired way.

According to a preferred embodiment of the invention, the article may not only be immersed at an angle but may also be rotated during immersion. Depending upon the shape of the article, the article is manipulated not only with translational movements during immersion, but also with rotational movements wherein the rotation may be within a single plane or, when required for articles of complex shape, rotation may be in more than a single plane. The rotational speed during immersion may also vary depending on the shape of the article to be decorated in order to achieve the desired application of the decorative film onto the article.

A process controller, which may be a computer, is provided for adjusting and controlling the essential process parameters of the decoration process. The shape of the article to be decorated may be determined using sensors known to those skilled in the art, such as conventional mechanical or optical scanners, or using manual input by an operator of the dimensions of interest. If, for example, an article having a plate-like shape is to be decorated, the total diameter of the plate, its depth and the angle of inclination of the plate rim are of particular interest. From the data defining the shape of the article, the controller can, based on experimental values, control the process parameters, such as the process of movement including the various angles of immersion with regard to the liquid surface, the immersion rates, the angles of rotation and rotational speeds, the advance speed of the decorative film, the flow rate of the water and the extending and/or condensing of the decorative film on the water surface by means of currents in the water. The control is thereby coordinated and synchronized so that, upon change of one process parameter, the other process parameters may be adjusted.

BRIEF DESCRIPTION OF THE DRAWINGS

An embodiment of the invention is described in more detail below with reference to the figures, in which.

DESCRIPTION OF THE PREFERRED EMBODIMENTS

Figure 1:
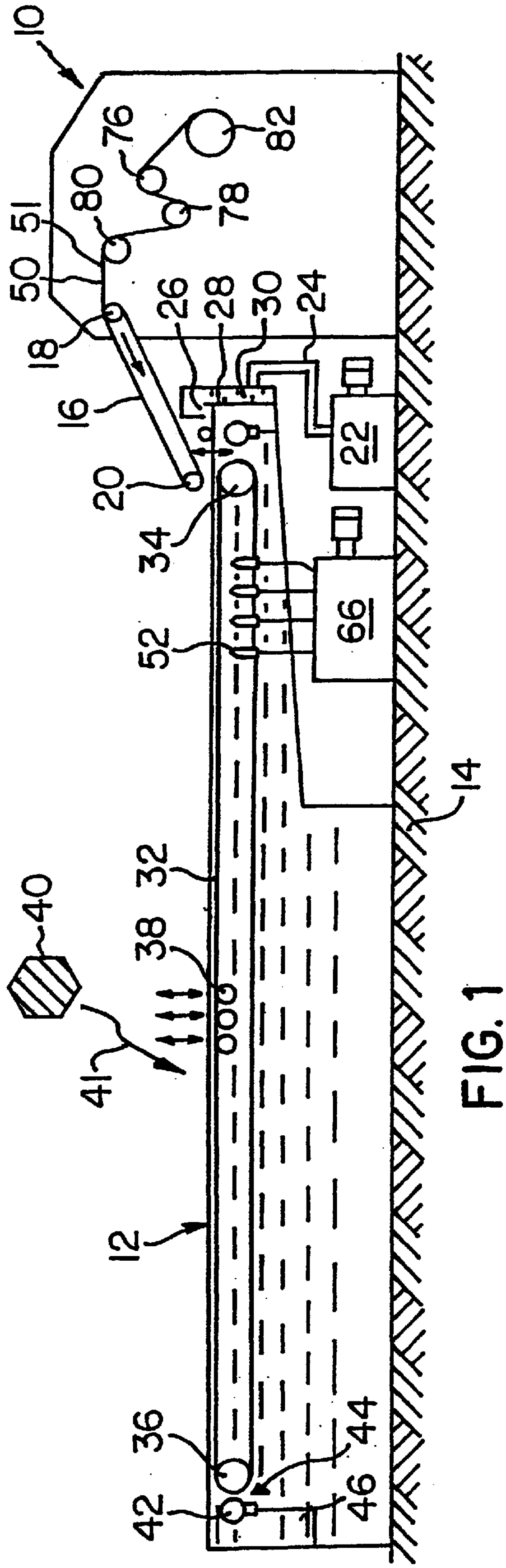
FIG. 1 schematically shows from the side an apparatus for applying a decoration to an article.

FIG. 1 shows a transfer printing apparatus. On the right a housing 10 in which a supporting film 50 having a series of decorations 51 on its upper side is fed by means of rollers 82, 76, 78, 80, 18, 20 to a tank 12 filled with a liquid such as water. The decorations 51 are separated from one another on the supporting film 50 and restrained relative to one another only by the supporting film 50. The chemical and physical structure of the film is not the subject of this invention, nor is the chemical and physical structure of the decoration applied to the film. Such decorations and supporting film are well-known by those skilled in the art.

The housing 10 and the water tank 12 stand on a common foundation 14 which isolates and supports the entire transfer printing apparatus in such a way that outside mechanical disturbing influences are greatly diminished.

Film 50 with the decoration 51 is brought from the housing 10 to the surface of the water in the tank 12 by means of a film feed 16 in the form of an obliquely running conveyor belt. The conveyor belt of the film feed 16 runs over rollers 18, 20.

Figure 2:
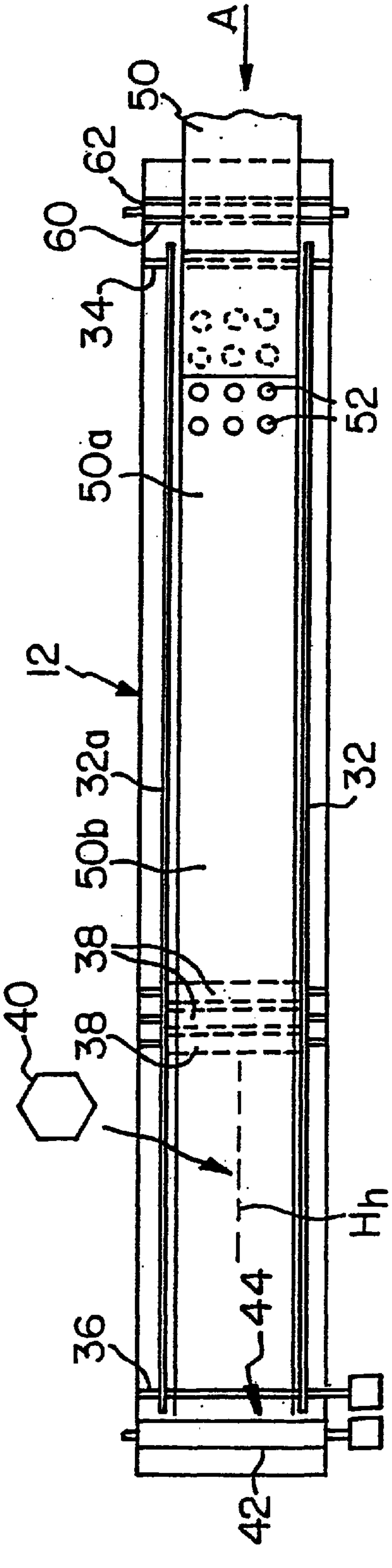
FIG. 2 shows a plan view of an apparatus according to FIG. 1.
Figure 3:
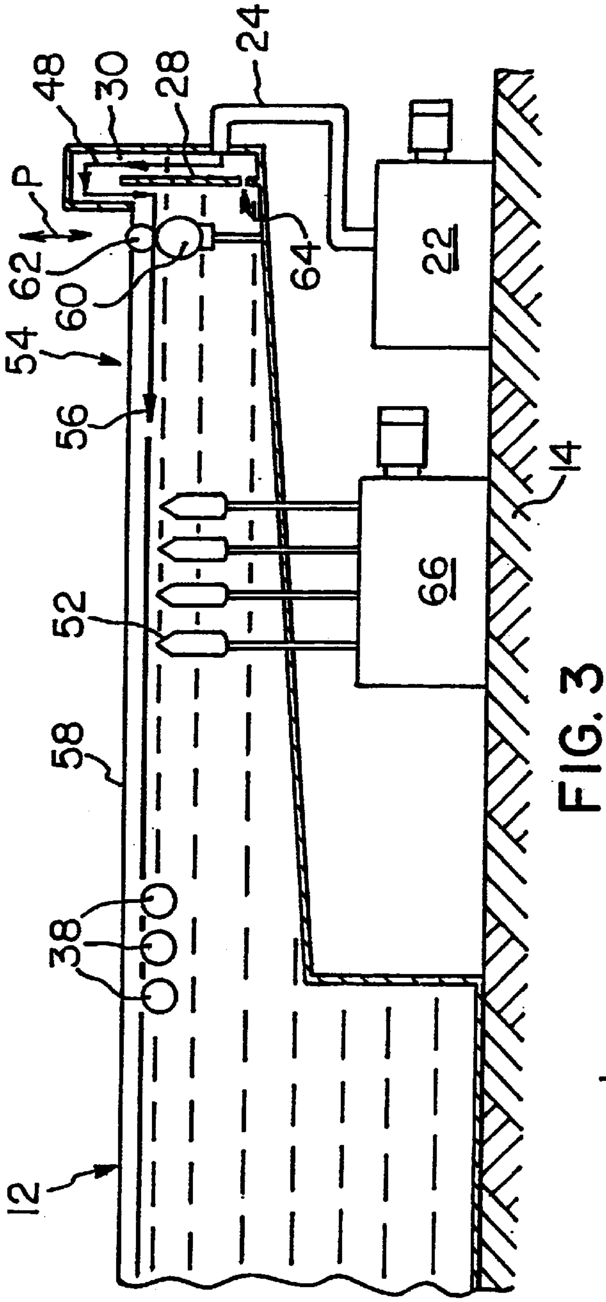
FIG. 3 shows a side view of an upstream section of the apparatus according to FIG. 1 with the water feed.

In FIG. 1, and in each of the FIGS. 1 through 3, the water flows from right to left through the tank 12. For this purpose, a pump 22 is provided which maintains water circulation. A supply line 24 leads from the pump 22 into a cavity 30. The cavity 30 is filled and water is pumped over a dam wall 28 at a height which lies above the surface of the water in the tank 12 to a water inflow 26. The flow path of the water is shown in more detail by arrow 48 in FIG. 3 and the introduction of the water into the tank 12 is described more precisely further below.

The film 50 and the decoration 51 are presented to the tank 12 by the film feed 16 which is advanced in the direction of the water flow. Guide belts 32, 32*a* are laterally spaced and run over rollers 34, 36, which extend across the width of the tank 12.

The process of transferring the decoration to an article is well-known by those skilled in the art and is discussed in the prior art patents previously identified. An article 40, which will receive the decoration 51, is immersed from above into the water in the tank 12 at a location marked by an arrow 41. At the same time, the film with the decoration is floating on the surface of the water, approximately at the height of the lateral guide belts 32, 32*a*. The article 40 is immersed over the decoration 51 such that the hydrostatic pressure on the floating decoration 51 urges the decoration 51 against the article 40.

Figure 5:
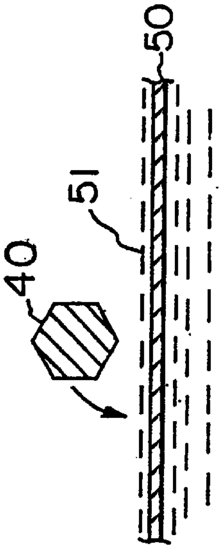
FIG. 5 schematically shows an article to be decorated with a film, floating on the water surface, with a decoration.

FIG. 5 schematically shows the immersion of the article 40 into the liquid of which the supporting film 50 and the decoration 51 are floating. During this immersion, hydrostatic pressure upon the decoration 51 urges the decoration 51 to conform to the three-dimensional shape of the article 40 and to adhere to the article 40. By this technique it is possible to print true to scale onto complicated three-dimensional articles. As illustrated in the discussion of the prior art patents, different mechanisms are known by those skilled in the art for immersing an article in liquid. However, the apparatus of the subject invention provides features and advantages neither taught nor suggested by the prior art.

During the immersion, the film 50 may largely, if not completely, dissolve in the water before the article 40 is pressed against the decoration 51. Therefore, after the decoration 51 is transferred to the article 40, there may remain in the flowing water residues of the film and of the decoration, which cannot be further used.

The roller 36 has, in addition to supporting the guide belts 32, 32*a*, an additional function in conjunction with roller 42, which is located downstream of roller 36 and extends across the entire width of the tank 12. These rollers are arranged such that a narrow gap 44 is left free between them. Film residues and decoration residues transported over the roller 36 reach the roller 42 and are transported further by the rotation of roller 42. These residues reach a filter 46 which separates the film residues and decoration residues from the water and discharges clean water into the lower region of the tank 12 and back to the pump 22. Also, through the narrow gap 44 between the rollers 36 and 42, relatively clean water returns into lower regions of the tank 12.

FIGS. 2 and 3 show schematic drawings of the apparatus from above and from the side. FIG. 3 illustrates details of the introduction of water into the tank. As already stated above with reference to FIG. 1, the water rises in the cavity 30 over the dam wall 28 and falls from there into the tank 12. Provided underneath the dam wall 28 is an opening 64 (FIG. 3) through which excess water can enter directly into the tank 12.

In FIG. 3, the path of the water over the dam wall 28 is schematically represented by arrow 48 and the associated solid line. The water is fed through an intermediate space between two rotating rollers 60, 62 into the tank. The two rollers 60, 62 are arranged vertically one above the other and are adjustable vertically in the direction of an arrow P. While preferably both rollers 60, 62 have rotary drives, at least one roller, such as the lower roller, has a rotary drive. The rotational speed of the rollers is such that the water is transported in a direction corresponding to an arrow 56. The arrow 56 also marks the surface of the water in the tank 12.

In FIG. 3, the lower roller 60 thus rotates counterclockwise and the upper roller 62 rotates clockwise. By adjusting the rollers 60, 62 in their vertical height, adjusting their distance from each other and adjusting the rotational speed, the flow of the water into the tank can be optimally controlled. For example, the distance between the two rollers may be about 1 cm, depending on the requirements of the article to be printed. The distance is used to control the rate at which water is introduced to the upstream end of the tank 12. The rotational speed of the rollers (mainly of the lower roller 60) can be used to influence the flow velocity at the surface indicated by the arrow 56 in the tank 12. The rollers 60, 62 are preferably made with a smooth surface, for example, of stainless steel.

The level of the water in the tank 12 is continuously measured by means of a sensor (not shown). Any of a number of commercially available sensors is suitable. This information about water level is passed to a computer, which controls all the adjustable components and evaluates this information correspondingly. For example, if waves occur, the computer can alter the rotation, position and vertical separation of the rollers 60, 62 in order to prevent the occurrence of waves and to keep the surface of the water calm.

It is possible to extend or condense the film 50 with the decoration 51 printed on it after the film 50 is introduced to the water in the tank 12. The film 50, with the decoration 51 printed on it, is transported from the film feed 16 and reaches the surface of the water in the tank 12 approximately at a point 54. There it floats on the surface and is carried along by the flow.

Figure 4A:
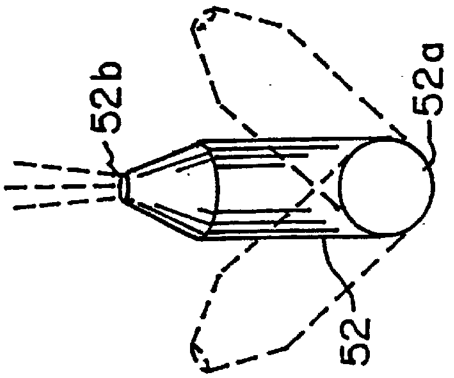
FIGS. 4A and 4B schematically show a nozzle for producing a water flow in an adjustable direction.
Figure 4B:
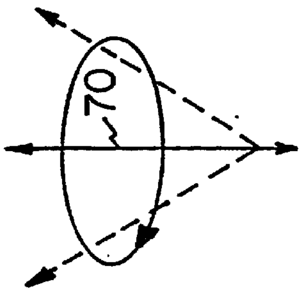

Arranged below the surface of the water in the tank 12 is a plurality of nozzles 52 capable of directing the water to flow in various directions. FIG. 4A shows schematically in an enlarged representation a typical nozzle 52. Each nozzle may be spatially positioned, according to choice, for changing the flow directions, depending on the desired shaping of the film in a way corresponding to the article to receive the decoration. FIG. 4B shows schematically the adjustability of the flow direction by means of a nozzle 52 pivotable about a base 52*a* and having a discharge orifice 52*b*. An axis 70 defines the flow direction of the nozzle 52, which is adjustable in an inclined manner with respect to the surface of the water as indicated by arrow 56.

According to the plan view of FIG. 2, an array of nozzles, for example an array of twelve nozzles in a 3×4 arrangement, is positioned in such a way that desired flows can be produced virtually at any desired point of the surface of the water as indicated by arrow 56. The nozzles 52 discharge a water flow upwardly or obliquely upwards in order to extend or condense the stretchable and compressible film. In the region 50*a*, the film 50 floating on the surface of the water as indicated by arrow 56 in the tank is thus extended or condensed in a way corresponding to the requirements of the article to be printed (40 in FIG. 1).

In FIG. 1, a pump 66 used to drive the water through the nozzles 52 is represented. It should be understood that while a 3×4 array of nozzles has been disclosed, any number of nozzle patterns may be suitable to extend or condense the film 50 and the associated decoration 51, and the invention should not be limited to one specific arrangement.

In the region 50*a*, the film 50 with the decoration 51 has reached its desired (extended or condensed) shape and is transported downstream over a plurality of rollers 38. The rollers 38 are adjustable in height in such a way that each of their upper edges is approximately flush with the surface of the water as indicated by arrow 56. The rollers 38 are preferably formed with a smooth surface, for example, of stainless steel. The rollers 38 preferably each have a rotary drive and may be adjusted for rotational speed and height. The rollers 38 can be used to calm the surface of the water, in particular downstream (to the left) and also to stabilize the advancement of the film. If need be, depending on the article receiving the decoration, the rollers 38 can also be used to adjust the advancing speed of the film to be faster or slower than the flow velocity of the water. Advancing the film at a faster speed is advisable in particular whenever the article to be printed has to be immersed very deeply into the tank or when the article has to be immersed quickly. Increasing the advancing speed of the film relative to the flow velocity of the water then prevents a tearing of the film.

In the case of the embodiment illustrated, three rollers 38 are provided which are cylindrical and independently adjustable with respect to one another for vertical position, rotational speed and horizontal distance. The rollers 38 can be used to control the feeding of the decorative film 50 as it progresses downstream.

Figure 6:
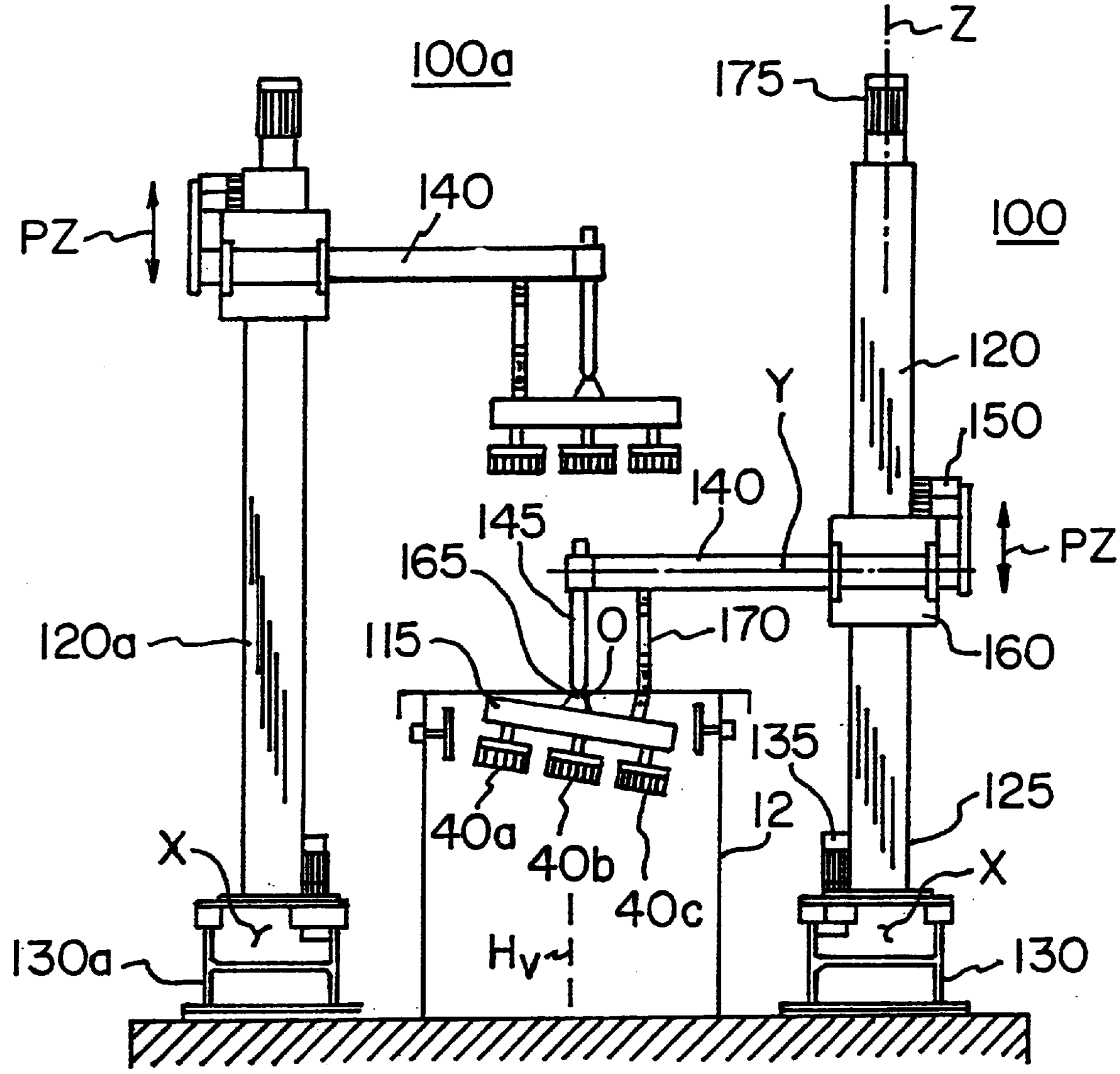
FIG. 6 schematically shows two robots moving articles to be decorated during the immersion operation.

FIG. 6 shows two robots 100, 100*a* for manipulating articles 40*a*, 40*b*, 40*c* to be printed when the articles are moved through the tank 12 (corresponding to the description relating to FIGS. 1 to 5). In this embodiment, three articles 40*a*, 40*b*, 40*c* are thus simultaneously decorated.

FIG. 6 is a front view in the direction of arrow A of FIG. 2. One robot each 100, 100*a* is arranged to the left and to the right of the tank 12. The robots are controlled by a controller which may be a computer (not shown) . The articles 40*a*, 40*b*, 40*c* to receive a decoration are each secured to a shaft 110*a*, 110*b*, 110*c* which is rotatably supported within the article holder 115. The article holder 115 may be moved in three directions, each orthogonal to the other.

Figure 7:
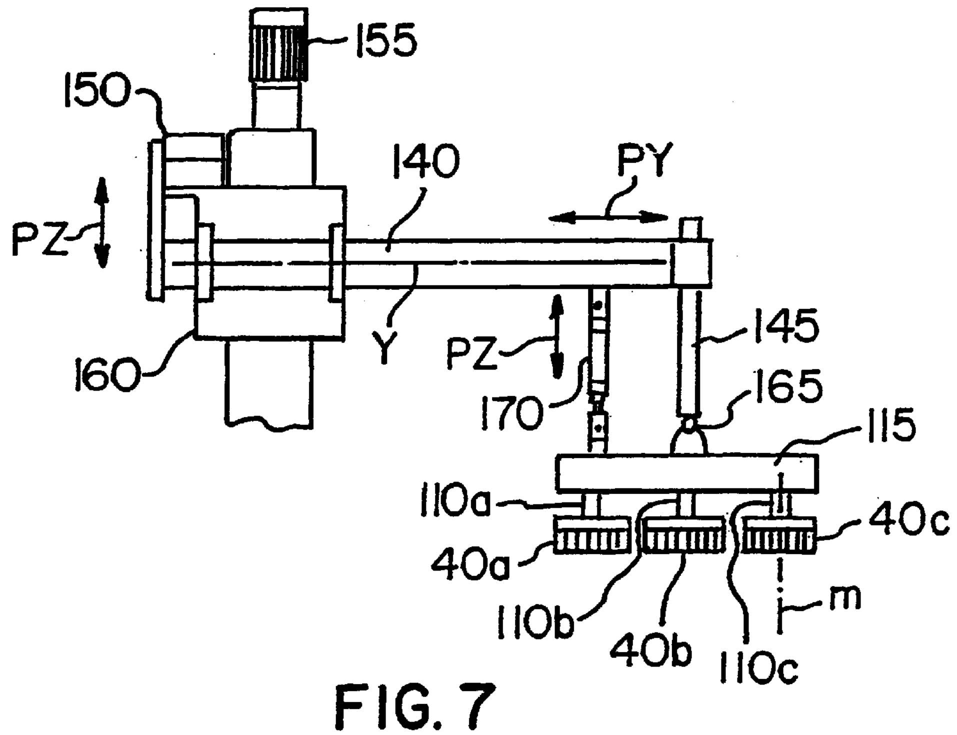
FIG. 7 shows a detail of a robot according to FIG. 6.

Each shaft 110*a*, 110*b*, 110*c*, which defines an axis "m" (FIG. 7) may be rotated using a variety of means known to those skilled in the art, such as, for example, a motor which engages a gearing arrangement on each shaft 110*a*, 110*b*, 110*c*. The rotatable shafts 110*a*, 110*b*, 110*c* permit the articles 40*a,* 40*b,* 40*c* to be fixed at a specific rotational position or to be rotated about axis "m".

In FIG. 6, the robot 100 arranged to the right of the tank 12 has a vertical column 120, whereas the robot arranged to the left has a vertical column 120*a*. The columns 120, 120*a* have bases 125 which are movable on rails 130 and 130*a,* respectively. The rails 130 and 130*a* are firmly secured to the floor.

Hereinafter, the discussion will be directed toward the robot 100 to the right in FIG. 6 with the understanding the robots 100 and 100*a* are identical and that all of the features discussed for robot 100 also exist for robot 10*a*.

The column 120 may be displaced in the direction along the "x" axis on the rails 130 using a motor 135. The "x" axis extends perpendicular to the plane of the drawing in FIG. 6, i.e., in FIGS. 1 to 3 between left and right, corresponding to the direction of arrow A of FIG. 2. The main plane of movement "H" of articles 40*a,* 40*b,* 40*c* is defined by horizontal axis "$H_h$" shown in FIG. 2 and vertical axis "$H_v$" shown in FIG. 6.

As an alternative, the column 120 may not move along rails 130 but may be fixed. In this instance, the motion available for manipulating the articles would not include translation of column 120.

An arm 140 extends horizontally from the vertical column 120. A post 145 connects the arm 140 with the article holder 115.

Motors 150 and 155 are secured to a positioning mechanism 160. The positioning mechanism 160 is slidably mounted to the vertical column 120 and, with the assistance of motor 150 and mechanical drives known in the art such as a gearing arrangement, may move vertically along the column 120 in the direction of arrow PZ along the "z" axis. The arm 140 is slidably mounted to the positioning mechanism 160 and, with the assistance of motor 155, may move horizontally within the positioning mechanism 160 in the direction of arrow PY along the "y" axis. Therefore, with the positioning mechanism 160 and the associated motors 150 and 155, the arm 140 is capable of being vertically displaced along column 120 and horizontally displaced within the positioning mechanism 160.

Figure 8:
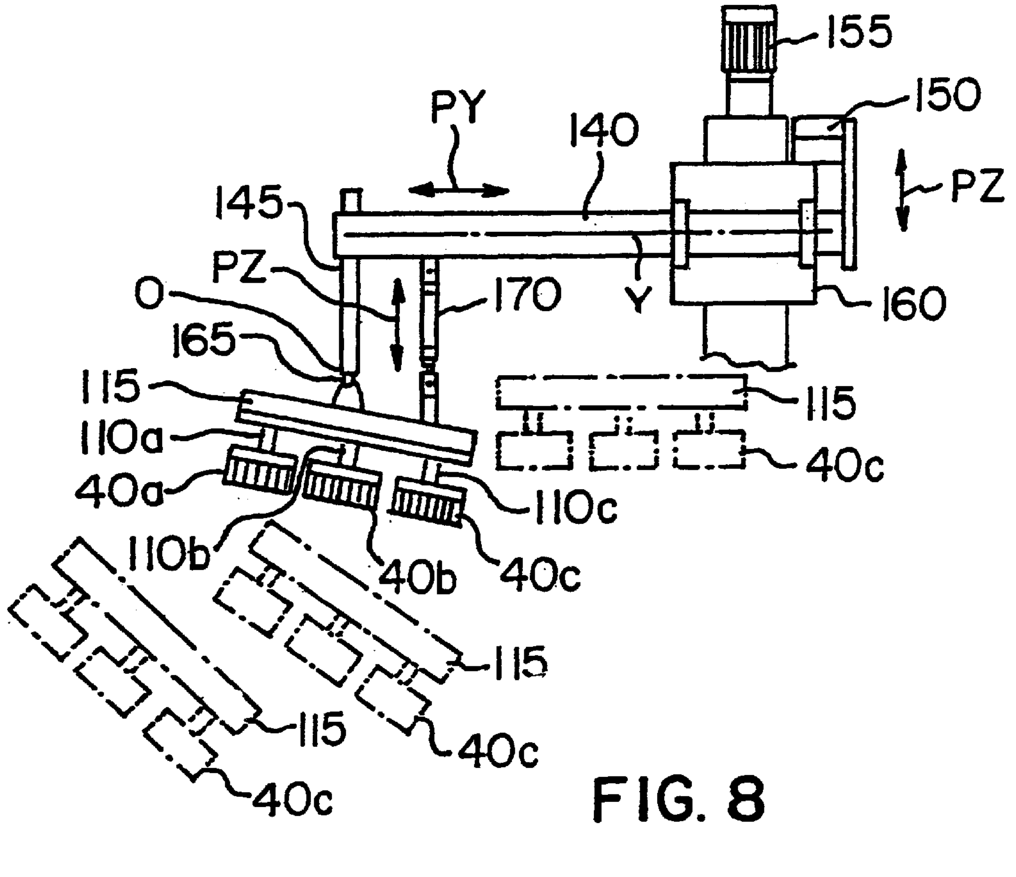
FIG. 8 schematically shows a succession of movements of the article moved by the robot.

The article holder 115 is pivotable about point 165, as shown in FIGS. 6 and 8. The pivotal movement is, in the embodiment shown, produced by a piston and cylinder arrangement 170 which performs a linear movement in the general direction of arrow PZ for pivoting the article holder 115 about an axis "O" which is perpendicular to the page in FIG. 6. The piston and cylinder arrangement 170 is pivotally connected to the arm 140 at one end and to the article holder 115 at the other end. To provide rotation, the piston and cylinder arrangement 170 is spaced from the post 145 as illustrated in the figures. The pivotal movement may be produced mechanically with a simple pivot, as shown, or may be produced with a suitable automatically controlled drive mechanism.

Therefore, each robot may be controlled to manipulate the articles 40*a*, 40*b*, 40*c* along the vertical "z" axis, the horizontal "x" axis and the horizontal "y" axis, which is perpendicular to the "x" and "z" axes. Additionally, each robot may be controlled to rotate each article 40*a,* 40*b* and 40*c* about an axis "m" extending along the shafts 110*a*, 110*b,* 110*c* of the article holder 115 and about an axis "o" extending from the page in FIG. 6.

The solid lines in FIG. 8 show a start position of the article holder 115 with articles 40*a,* 40*b,* 40*c* hanging thereon, positioned for movement to transfer the decorations. The dotted lines show a variety of different positions the articles 40*a,* 40*b,* 40*c* may assume during the immersion operation.

Each robot moves the articles 40*a,* 40*b,* 40*c* substantially along the main plane of movement H during immersion according to FIG. 2, i.e., downstream of the rollers 38 and in front of roller 36. It is possible to move the articles 40*a,* 40*b,* 40*c* in the direction "A" shown in FIG. 2 even if the column 120 is fixed to the floor, instead of riding along a rail 130. In this instance, the column 120 may be rotated about its own axis such that the arc produced will provide a component of movement in the downstream direction. The column 120 may be rotated using a motor 175 and gearing arrangement (not shown) known to those skilled in the art. The translations and rotations have been described in global coordinates based upon the "x" axis defined in the direction of the liquid flow in the tank 12. When the column 120 is rotated, these global axes must be treated as local axes and collectively rotated as the column 120 rotates.

Rotation of the column 120 provides movement of an article 40 by the arm 140 in an arc which may be defined by movement in a horizontal direction having a component along the "x" axis parallel to the direction of flow and also having a component along the "y" axis perpendicular to the direction of flow.

Furthermore, with the arm 140 aligned along the "y" axis perpendicular to the direction of flow, rotation of the article holder 115 provides rotation which may be defined by movement in a horizontal direction having a component along the "y" axis perpendicular to the direction of flow and in a vertical direction having a component along the "z" axis.

Additionally, with the shafts 110*a*, 110*b*, 110*c* aligned vertically along the "z" axis, rotation of these shafts will cause rotation of each article 40*a,* 40*b,* 40*c* on a shaft 110*a,* 110*b,* 110*c*. Although the portion of each article 40 colinear with the axis of rotation of the respective shaft 110 will not experience any motion, the portion of the article 40 radially away from the axis will experience rotation which may be defined as movement in a horizontal direction having a component along the "x" axis parallel to the direction of flow and also having a component along the "y" axis perpendicular to the direction of flow.

Furthermore, when the arm 140 is rotated with the vertical column 120 and the article holder 115 is rotated about axis "o", then there is rotation of an article 40 about an axis having a component parallel to an "x" axis which extends in a horizontal direction parallel to the direction of flow, rotation of the same article 40 about an axis having a component along the "y" axis perpendicular to the direction of flow, and rotation of the article 40 about an axis having a component vertically along the "z" axis.

As can be seen, by selective rotation of the vertical column 120, the article holder 115 and the shafts 110*a,* 110*b,* 110*c* along with selective translation of the column 120, the positioning mechanism 160 and the arm 140, it is possible to impart to an article 40 any desired translation or rotation in an effort to promote the application of a decoration onto an article.

Although the present invention has been described with respect to a specific embodiment, numerous modifications are possible without departing from the invention, and it is desirable to cover all modifications falling within the spirit and scope of this invention as set forth in the accompanying claims.

I claim:

1. A method for applying a decoration onto an article in which the article is immersed into a flowing liquid upon which the decoration is floating, thereby coming into contact with the decoration, wherein immersing the article is comprised of the steps of:

a) moving the article vertically into the liquid along a "z" axis; and b) moving the article in a horizontal direction having a component along a "y" axis perpendicular to the direction of flow.

2. The method according to claim 1 wherein immersing the article further comprises moving the article in a horizontal direction having a component along an "x" axis parallel to the direction of flow.

3. The method according to claim 1 wherein immersing the article is further comprised of the step of rotating the article.

4. The method according to claim 3 wherein the step of rotating the article is comprised of rotating the article about an axis having a component parallel to an "x" axis which extends in a horizontal direction parallel to the direction of flow.

5. The method according to claim 3 wherein the step of rotating the article is comprised of rotating the article about an axis having a component parallel to the "z" axis.

6. The method according to claim 3 wherein an article holder has a generally planar configuration and is used to secure at least one article, and wherein the step of rotating the article comprises rotating the article about an axis "m" extending perpendicular to the planar configuration of the article holder.

7. The method according to claim 1 wherein the movement of the article during immersion is guided based upon the shape of the article.

8. A method for applying a decoration onto an article in which the article is immersed into a flowing liquid upon which the decoration is floating, thereby coming into contact with the decoration, wherein immersing the article is comprised of the steps of:

a) moving the article vertically into the liquid along a "z" axis; and b) rotating the article about an axis having a component parallel to an "x" axis which extends in a horizontal direction parallel to the direction of flow.

9. An apparatus for applying a decoration onto an article in which the article is immersed into a flowing liquid upon which the decoration is floating comprised of:

a) means for moving the article vertically into the liquid along a "z" axis; and b) means for moving the article in a horizontal direction having a component along a "y" axis perpendicular to the direction of flow.

10. The apparatus according to claim 9 further comprising means for moving the article in a horizontal direction having a component parallel to the flow direction along an "x" axis.

11. The apparatus according to claim 9 wherein the means for moving the article in a horizontal direction along a component of the "y" axis is an arm which holds the article and which is slidably mounted along the "y" axis to a positioning mechanism which is mounted to a vertical column.

12. The apparatus according to claim 11 wherein the means for moving the article along the "z" axis is the positioning mechanism, which is slidably mounted upon the vertical column.

13. The apparatus according to claim 10 wherein the means for moving the article in a horizontal direction along a component of the "x" axis is the vertical column which has a base with wheels which move upon a rail extending along the "x" axis.

14. The apparatus according to claim 9 further including means for rotating the article about an axis having a component parallel to the "x" axis.

15. The apparatus according to claim 14 wherein the means for rotating the article about an axis having a component parallel to the "x" axis is a post extending between the arm and article holder wherein the post is secured to the article holder with a pivoting connection and a movable piston spaced next to the post is pivotally secured to the arm at one end and to the article holder at the other end such that motion of the piston rotates the article holder.

16. The apparatus according to claim 9 further including means for rotating the article about an axis having a component parallel to the "z" axis.

17. The apparatus according to claim 16 wherein the article is supported by an article holder which is linked to a vertical column for support and wherein the means for rotating the article about an axis having a component parallel to the "z" axis is comprised of a motor and gearing arrangement which rotate the column and therefore rotate the article.

18. The apparatus according to claim 9 wherein an article holder has a generally planar configuration and is used to secure at least one article by a shaft extending perpendicularly from the article holder to the article, wherein the shaft is rotatable about the article holder, thereby capable of imparting a rotation about an axis "m" perpendicular to the planar article holder.

19. The apparatus according to claim 9 wherein the article may be any one of a plate, telephone receiver or furniture piece.

20. An apparatus for applying a decoration onto an article in which the article is immersed into a flowing liquid upon which the decoration is floating comprised of:

a) means for moving the article vertically into the liquid along a "z" axis; and b) means for rotating the article about an axis having a component parallel to an "x" axis which extends in a horizontal direction parallel to the direction of flow.

21. An apparatus for applying a decoration onto an article in which the article is immersed into a flowing liquid upon which the decoration is floating comprised of:

a) means for moving the article vertically into the liquid along a "z" axis; and b) means for rotating the article about an axis having a component parallel to the "z" axis.

* * * * *

UNITED STATES PATENT AND TRADEMARK OFFICE
CERTIFICATE OF CORRECTION

PATENT NO. : 5,916,400
DATED : June 29, 1999
INVENTOR(S) : Maximilian Zaher

It is certified that error appears in the above-identified patent and that said Letters Patent is hereby corrected as shown below:

Title Page, refer to [76] Inventor: "Maximillian" should read --Maximilian--.

Column 2 Line 1 "Patent No. No." should read --Patent No.--.

Column 7 Line 12 "robot 10a" should read --robot 100a--.

Signed and Sealed this

Seventh Day of December, 1999

Attest:

Q. TODD DICKINSON

*Attesting Officer* *Acting Commissioner of Patents and Trademarks*